R. U. ETZENSBERGER.
Apparatus for Making Infusions.

No. 213,815. Patented April 1, 1879.

UNITED STATES PATENT OFFICE.

ROBERT U. ETZENSBERGER, OF LONDON, ENGLAND.

IMPROVEMENT IN APPARATUS FOR MAKING INFUSIONS.

Specification forming part of Letters Patent No. 213,815, dated April 1, 1879; application filed July 31, 1878; patented in England, January 21, 1878.

*To all whom it may concern:*

Be it known that I, ROBERT ULRICH ETZENSBERGER, of London, England, have invented new and useful Improvements in Apparatus for Making Infusions, which improvements are fully set forth in the following specification, reference being had to the accompanying drawings.

In the specification of a former United States patent granted to me, dated 22d May, 1877, No. 190,964, I have described an arrangement of apparatus for making infusions or extracts from substances by the aid of a heated liquid, such as water, which is made to pass through the substance to be infused, the part of the apparatus containing such substance not being exposed to the direct heat of the heating medium or fuel employed in heating the aforesaid heated liquid.

The object of this present invention is to improve the construction and mode of application of such apparatus; and in order that this my invention may be fully and clearly understood, I will now proceed to describe the same with reference to the accompanying drawings, in which—

Figure 1:
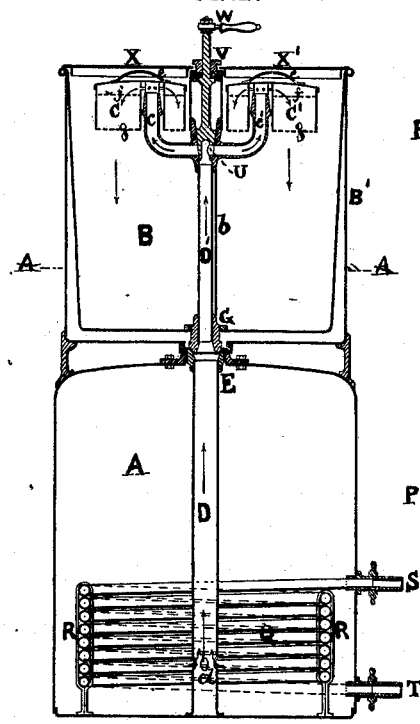
Figure 2:
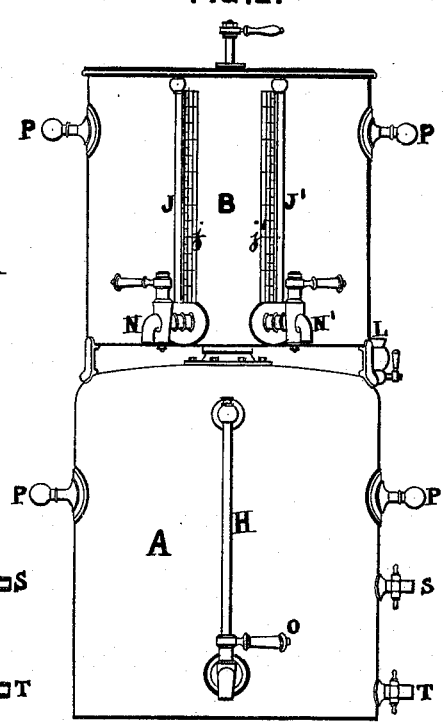
Figure 5:

Figure 1 is a vertical section through the apparatus according to one arrangement; Fig. 2, an outside elevation view; and Fig. 3, a horizontal section through the upper portion of same at line A A, Fig. 1. Figs. 4 and 5 are details belonging thereto.

Figure 3:
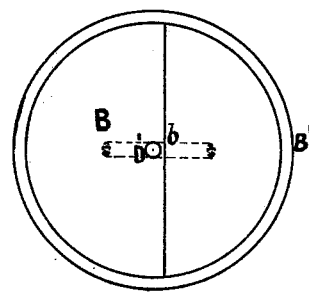
Figure 4:
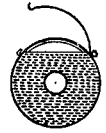

Referring to Figs. 1, 2, and 3, the apparatus consists, mainly, of a lower closed vessel, A, containing the water or other liquid to be heated, and an upper closed vessel, B. These two vessels are placed in communication by pipes D and D', which form a ground cone-joint against each other, and are held together by a bayonet-joint at that point, or in any other suitable manner. The lower vessel, A, is, by preference, fitted with a closed steam-coil, Q, having its inlet at an upper level at S, and its outlet at a lower level at T, so that the condensed water may drain down.

The coil may rest on staple-frames R, as shown. By means of cocks or valves at the inlet and outlet, the heat imparted to the liquid in the vessel A may be suitably regulated, as required.

The upper vessel, B, is surrounded with a mantle or jacket, B', which, by openings at E, communicates with the upper part of the lower vessel, A. The pipe D communicates with the lower part of the vessel A by one or more openings, as shown at *d*.

As seen clearly in Fig. 3, the upper vessel, B, is, by a partition-wall, *b*, divided in two compartments—one, say, for tea, and the other, say, for coffee—and each fitted with its own gage-glass J and J', for indicating the respective levels of the liquid contents of each compartment.

*j* and *j'* are graduated indices for affording greater convenience in working the apparatus. N and N' are the cocks for drawing off the infusions. There is a separate cover over each compartment, as shown. The vessel B may be made with more than two compartments, and the same is provided with a cover or covers, as shown at *x x'*.

The pipe D' terminates at its upper part in the cone-seat for the hollow cone-plug of a cock, U, with spindle passing up through a screwed gland, V, which serves to hold the plug in place. The cock-spindle is fitted with a handle, W. By turning the handle W one way or the other, communication is established between the pipe D' and one or other of the branch-pipe bends *c* or *c'*, which are formed with coned or other bayonet joint at their upper ends, for connecting with the receptacles C and C', containing, say, one tea-leaves and the other ground coffee. One of these receptacles (in this case made semicircular) is shown separately at Fig. 4 in plan, and at Fig. 5 in elevation. Each receptacle is formed with a handle, *e*, or knob at the top, for taking hold of it, and with a perforated partition, *f*, near the top. There is an empty space between the top and this perforated partition *f*. It has also a perforated bottom, *g*. The tea or coffee, or other substance to be infused or extracted, is put in through a hinged side door. (Shown open in Fig. 4.) It will be presently explained that by this construction the return-valve necessary in my former arrangement is not needed, and that the action of the percolating liquid is in the opposite direction.

The action and mode of application of the apparatus hereinbefore described are as follows, say, for making coffee or tea infusions: Water having, by any convenient means, been put into the lower vessel, A, to a suitable level—viz., to, say, within an inch from the top—steam is let into the coil Q by the pipe S, the passage through the same being regulated by cocks at the inlet S and the outlet T, and the water heated to boiling-point. Tea is also placed in one of the receptacles C C', and coffee in the other, and the receptacles are closed and placed on the top of the branch pipes c c'. The lids are then placed on the top of the compartments of B, and when the water in the lower vessel, A, is boiling hot, the air-cock and the filling-cock are closed, as explained in the specification of my former aforesaid patent. The cock U is turned so as to open communication, say, with C', as shown. As the water in the vessel A becomes boiling hot, and a certain amount of steam under pressure is generated, the boiling water is forced up, by the openings d, into the pipe D D', and, by the branch pipes c', into the upper part of the box C'. The steam also passes through the openings at E into the jacket between B and B'.

The boiling-hot water is, by the steam-pressure, forced into the space between the top and the perforated partition f, and down through latter in the receptacle C', through the tea or coffee contained in the compartment below, and issues as infusion or extract through the perforated bottom g, dropping into the vessel B. When a sufficient amount of extract has been thus made corresponding to the quantity of tea or coffee contained in the box, (which is indicated by the gage-glass J' and index j',) the cock U may be turned so as to shut off communication between the pipe D' and the receptacle C'. The infusion or extract made as described may now be drawn off as required, and the process for making an extract or infusion of the substance contained in the receptacle C may then be carried on in a similar manner by simply turning the cock U to the other side.

It will now be clear that no return-valve is required in the pipe D D', as I make use of an overflow action of the boiling water, none of which can return after having passed into one of the receptacles C or C'. As soon as the pressure ceases, the clean boiling water in the pipe D D' will return into the boiler A, which thus is kept perfectly clean. The condensed water in the jacket below and around the vessel runs back into the vessel A.

The receptacles C C' may be made of different sizes or capacities, to suit requirements as to quantity and strength of infusion desired.

The apparatuses thus far described are suitable for making tea, coffee, and other infusions on a large scale—say, for hotels, steamships, and other places.

I am aware that two vessels have been used in making infusions, the hot water from one vessel passing into the other by the accumulation of the steam-pressure; and in this case the hot water has passed through the tea or other material from which the infusion is to be made, such material being in a receptacle with a perforated bottom.

I claim as my invention—

1. The combination, in an infusion apparatus, of the vessel A, steam-heating coil Q, ascending pipe D, vessel B, vertical pipe D' within the vessel B, branch pipes c c', and separate receptacles C C', arranged and constructed substantially as specified.

2. In an infusion apparatus, the vessels A B B', in combination with the vertical pipes D D', receptacles C C', and openings at E, for the passage of steam into the jacket B' around the vessel B, substantially as set forth.

R. U. ETZENSBERGER.

Witnesses:
 E. G. BREWER,
 GEO. COXHEAD,
  33 *Chancery Lane, London.*